United States Patent
Daly et al.

(10) Patent No.: US 9,106,971 B2
(45) Date of Patent: *Aug. 11, 2015

(54) IP-BASED TELEVISION MESSAGING SERVICES

(71) Applicant: AT&T Mobility II LLC, Atlanta, GA (US)

(72) Inventors: Brian Kevin Daly, Atlanta, GA (US); DeWayne Allan Sennett, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/040,689

(22) Filed: Sep. 29, 2013

(65) Prior Publication Data

US 2014/0033255 A1    Jan. 30, 2014

Related U.S. Application Data

(62) Division of application No. 11/691,208, filed on Mar. 26, 2007, now Pat. No. 8,683,510.

(51) Int. Cl.
*H04N 7/10* (2006.01)
*H04N 7/025* (2006.01)
*H04N 21/61* (2011.01)
*H04N 21/4788* (2011.01)

(52) U.S. Cl.
CPC ....... *H04N 21/6175* (2013.01); *H04N 21/4788* (2013.01)

(58) Field of Classification Search
USPC .............................................. 725/32, 33, 37
See application file for complete search history.

(56) References Cited

U.S. PATENT DOCUMENTS

| | | |
|---|---|---|
| 2002/0126708 A1 | 9/2002 | Skog et al. |
| 2004/0258063 A1 | 12/2004 | Raith et al. |
| 2005/0005306 A1* | 1/2005 | Kim et al. ...................... 725/131 |
| 2005/0091694 A1* | 4/2005 | Rambo ......................... 725/110 |
| 2006/0074550 A1 | 4/2006 | Freer et al. |
| 2006/0156332 A1 | 7/2006 | Kendall |
| 2007/0016644 A1* | 1/2007 | Corona ......................... 709/206 |
| 2007/0079345 A1* | 4/2007 | McEnroe ...................... 725/106 |
| 2007/0115389 A1 | 5/2007 | McCarthy et al. |
| 2007/0275690 A1 | 11/2007 | Hunter et al. |
| 2008/0181377 A1 | 7/2008 | Qiu et al. |
| 2011/0179129 A1* | 7/2011 | McKissick et al. ........... 709/206 |
| 2014/0132780 A1* | 5/2014 | Levien et al. .............. 348/207.1 |

* cited by examiner

*Primary Examiner* — Nnenna Ekpo
(74) *Attorney, Agent, or Firm* — Parks Wood LLC (57) ABSTRACT

Architecture for the delivery of IP-based messages from wired and/or wireless devices to a television system. The means for delivery can be via an Internet Protocol Television (IPTV) technology. The message is processed through a messaging system that obtains a mapping of a message address to an IPTV address, and routes the message to an IPTV network for delivery the desired television system for presentation. Messaging can be via SMS (short message service) for textual content, MMS (multimedia messaging service) for multimedia content, or other messaging technologies, such as instant messaging, an e-mail, for example. Optionally, the message from the user device can include a request for confirmation of delivery of the message to the television. The confirmation can then be routed back over an IP data network to the user device and presented to the user.

20 Claims, 10 Drawing Sheets

IP-BASED TELEVISION MESSAGING SERVICES

CROSS REFERENCE TO RELATED APPLICATIONS

This application is a Divisional of U.S. application Ser. No. 11/691,208, filed Mar. 26, 2007, the entirety of which is herein incorporated by reference.

TECHNICAL FIELD

This invention relates to wired/wireless communication systems, and more specifically, to IP messaging to and from television systems.

BACKGROUND

Digital communications provides significant advantages over analog communications, specifically with respect to the capability of addressing devices and subsystems. This is central to the flow of information between nodes or devices disposed on the Internet where IP-based devices can be addressed uniquely such that information can be routed to only a single device or groups of devices called out according to the respective addresses. The convergence of the IP-based services and cellular communications services has opened the door for providing services that heretofore were not available to the cellular user who seeks access to IP-based networks, as well as for IP users seeking access to services of the cellular networks. Wireless devices such as portable computers and smartphones can now access services on wired/wireless networks using IP technology.

Taking part in the digital communications boom, vendors of appliances and home entertainment systems, for example, design such systems to be network addressable nodes as part of IP networks for receiving and transmitting digital signals and data. Cable and satellite television systems transmit content in a digital format to televisions and other media output systems. Moreover, Internet connectivity using IP packet traffic can be obtained over the same feed as the cable and satellite television digital signals.

A new technology in the area of digital television is Internet Protocol TV (IPTV) which describes a system that can receive and display video signals encoded as IP packets. Rather than replacing the TV with a PC as the main tool to watch content via IPTV, for example, vendors are bringing the Internet to the existing TV, via a set-top box, for example. Given this added IP capability to the existing television systems offers additional opportunity for presenting information to viewers.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Disclosed are systems and methods for the creation and delivery of messages from wired and/or wireless devices to a television (TV) system (e.g., TV unit, set-top box (STB)) via an IP-based TV addressable protocol technology (e.g., Internet Protocol TV (IPTV)). For example, a user can send a message from a wireless device (e.g., computing system) addressed to a specific addressable TV system. The message can be processed through a messaging system that obtains a mapping of a message address (associated with the originating device) to an IP TV address, and routes the message and message content to an IP-based TV network for delivery to the desired TV system and presentation.

In one embodiment, a mobile user can create and send a message from a cell phone to a specific TV. Messaging can be via SMS (short message service) for textual content, MMS (multimedia messaging service) for multimedia content, or other messaging technologies, such as instant messaging, for example. The message can also include attachments such as text and/or multimedia files for processing and presentation at the destination TV system(s).

In an alternative embodiment, the disclosed IP-based TV addressing and messaging communications architecture can be employed to communicate emergency alerts to IP-based TV viewers. For example, a message originator can send single message to multiple destination IP-addressable TVs.

In an optional embodiment, the message from the user device can include a request for confirmation of delivery of the message to the television. The confirmation can then be routed back over an IP data network to the user device and presented to the user.

To the accomplishment of the foregoing and related ends, certain illustrative aspects of the disclosed architecture are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

The disclosed messaging and presentation architecture facilitates the creation and routing of messages from devices of wire and/or wireless networks to an IP-addressable television (TV). This can be accomplished using Internet Protocol TV (IPTV) technology, for example, or any suitable technology that facilitates IP messaging from a computing device to an IP-capable and addressable presentation device (e.g., TV). The devices can be computers and mobile devices as well.

As required, detailed embodiments of the invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
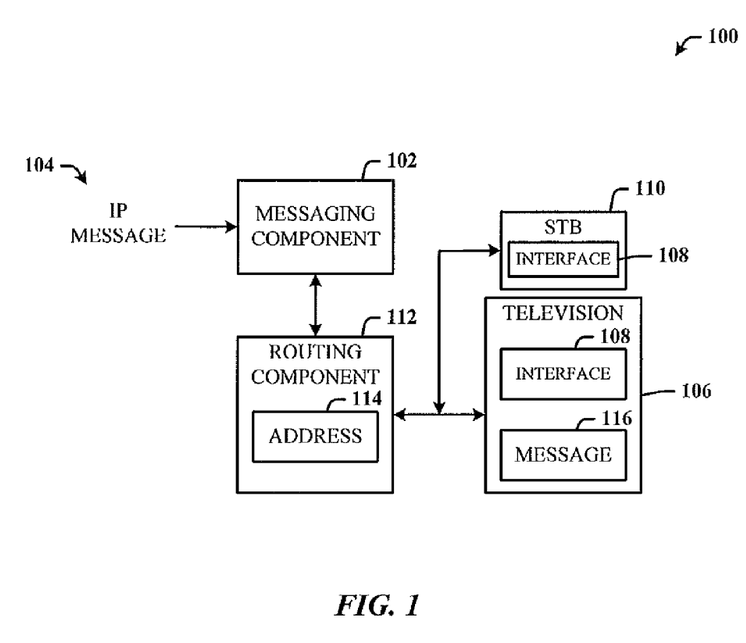
FIG. 1 illustrates a computer-implemented messaging system in accordance with the invention.

Reference is now made to the drawings, wherein like reference numerals are used to refer to like elements throughout. FIG. 1 illustrates a computer-implemented messaging system 100 in accordance with the invention. The system 100 can include a messaging component 102 for receiving an IP-based message 104 for communication to a TV 106. The TV 106 can include an internal IP interface 108, or the interface 108 can be provided in an external unit similar such as a set-top box (STB) 110. The interface 108 includes the hardware/software logic and circuits capable of providing an IP-addressable system and for interacting with IP network communications.

The system 100 can further include a routing component 112 for routing the message 104 to the TV 106 based on an address 114 that uniquely identifies the TV 106 (or associated STB 110) and to which the message 104 is mapped. Ultimately, the input IP message 104 will be presented via the TV 106 as a message 116.

Figure 2:
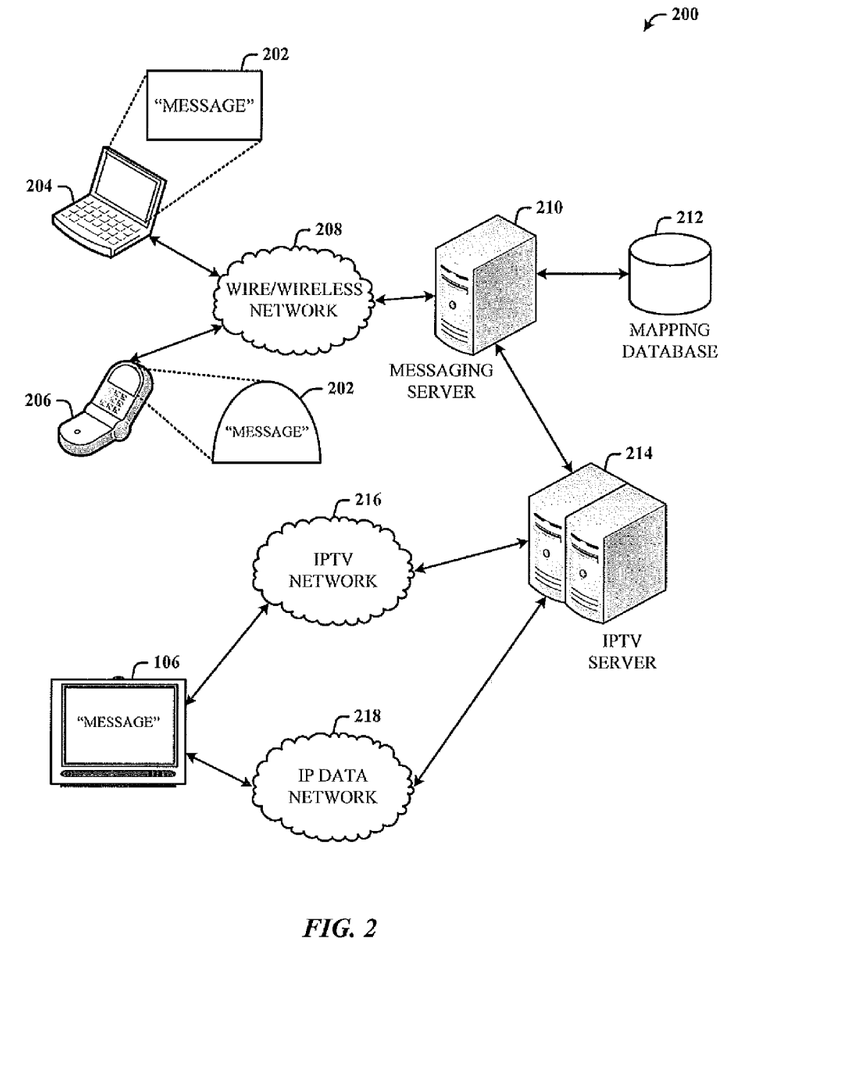
FIG. 2 illustrates a more detailed diagram of a system for IP-based messaging to a television.

FIG. 2 illustrates a more detailed diagram of a system 200 for IP-based messaging to a television. A message 202 that has been created by a computing device 204 (e.g., a PC, PDA, tablet PC, etc.) and/or mobile device 206 is created and communicated to a wired and/or wireless network (WWN) 208 for delivery to the specific TV system 106.

The WWN 208 can include a cable network, packet cable, GSM (global system for mobile communications), satellite network, UMTS (universal mobile telecommunications system), EDGE (enhanced data for GSM evolution), TDMA (time division multiple access), CDMA2000 (code division multiple access 2000), iDEN (integrated dispatch enhanced network), 2-way paging, WiFi, WiMax, Bluetooth, or any other communications connection technology.

The message 202 can be a text-only message such as associated with an SMS (short message service) message, or can be a multimedia message with photos, graphics, audio clips, text and video clips such as is associated with an MMS (multimedia messaging service) message, for example. However, these are only two examples, in that, any suitable messaging frontend program (e.g., email, web interface, instant messaging) or system can be employed, and which provides a user interface (UI) via which to select the destination TV(s) for reception of the message(s).

The message 202 is routed over the WWN 208 to a messaging server 210, the message including message content, the specified TV address, and an optional confirmation indicator. The messaging server 210 processes (e.g., parses) the TV address from the message for transmission to a mapping database 212 that maps message addresses to a destination TV unit associated with an IPTV address. The IPTV address is then returned to the messaging server 210. Note that although the description focuses on IPTV as the technology for communicating a message to the TV, other IP-based technologies for communicating with addressable TVs can also be employed.

The messaging server 210 sends the created message 202, associated IPTV address and, optionally, a delivery confirmation indicator and request, to an IPTV server 214. The IPTV server sends the message 202 to the indicated IPTV address via an IPTV network 216. The IPTV network 216 delivers the message 202 to the TV system 106 associated with the specific IPTV address. If the message transport of the IPTV network 216 is a broadcast technology, the message 202 may be received on multiple TV systems. Alternatively, the message broadcast to multiple TV systems can be controlled to only be presented on the TV system 106 associated with the specified IPTV address.

The following description details operation when the message 202 is associated with a request for confirmation of receipt of the message at the TV system 106. The confirmation indicator and/or request can be presented via the destination TV system 106, in response to which the user or a viewer interacts with the system 106 to select a delivery confirmation indication, for example, "Return Confirmation to Sender". Alternatively, this can be made a configurable setting where the confirmation signal is sent automatically once the signal has been processed by the TV system 106 (e.g., interface 108 or STB 110 of FIG. 1).

This can be useful in an emergency situation as a means to test viability of the connection all the way to the TV system 106. For example, if the location is on fire, the fact that the TV system 106 returns the confirmation signal provides some indication that fire may not have consumed that area of the location. However, this does not provide a sufficient indication as to the status of people who may be in the location.

In a more suitable implementation, as described above by user interaction with the confirmation request, the fact that the confirmation was received into the network confirms that a person interacted to cause delivery of the confirmation. Thus, barring any hardware failure that caused the confirmation to be sent, it can be inferred with high probability that a person caused the confirmation to be sent, and is present at the location.

The confirmation signal (or packets) transmitted back to the network can also include data that indicates whether the confirmation was automatically generated or based on manual user interaction. In yet another implementation, if an emergency is in-process, the message can be sent repeatedly or periodically according to a predetermined procedure or rule as a rudimentary means of communications with people who may be unable to exit the location. This can be a means to "pulse" equipment in the location for the desired purposes.

The TV system 106 sends the delivery confirmation response to an IP data network 218, and therefrom, to the IPTV server 214. The IPTV server 214 communicates the delivery confirmation message to the messaging server 210, where the messaging server 210 addresses the delivery confirmation message for delivery to the originating device(s) (204 and/or 206). The address for the delivery confirmation message can be stored with the message in the messaging server 210, if desired. Alternatively, the address for the delivery confirmation message can be passed within the delivery confirmation indicator that was sent for presentation on the TV system 106, and then included in the confirmation message that is returned by the TV system 106 to the network.

It is within contemplation of the subject architecture that the returned confirmation message can be delivered to not only the originating device (e.g., computer 204), but also to other designated devices (e.g., the phone 206). This can be made configurable in the UI of the originating device, for example, where the user can designate the devices for receiving the confirmation response. Alternatively, or in combination therewith, the confirmation response can be designated for return to multiple devices and/or systems via the mapping database 212. Thus, if the originating user stipulates that the message is to be delivered to multiple TV systems, the confirmation responses from all destination TVs can be returned to a single originating device or to multiple devices.

In yet another implementation, all of the response messages can be returned to a device other than the originating device. Still further, based on addressing and message mapping capabilities described herein, the responses from multiple TV systems can be returned in groups to the originating device and/or to another device. For example, all confirmation responses from TV systems of a first floor can be returned to the computer 204, while all confirmation responses from TV systems of a second floor can be returned to a command center. These are only a few examples of the flexibility provided by the disclosed architecture for sending messages and receiving a response back.

Delivery confirmation can also be routed to a server that collects, analyzes, and summarizes the delivery confirmation results, for example. This can be especially useful in enterprise applications. The server can be collecting statistics and other delivery status information about a specific message, for example.

Individuals or enterprise entities can now send messages to specific TV systems throughout the local, enterprise, and/or public networks. For example, a student at college can send a text message and/or video clip to a TV system of a parent. Another application includes an enterprise administrator that wants to create a multimedia message for display to the TV system in each of the break rooms of a facility.

A user of the TV system 106 can use functions of a handheld remote control, for example, to manage the play, pause, replay, rewind, fast forward, record, etc., of the context of the received message. Moreover, if the display portion of the TV system is turned off, the received message and/or delivery information indication can be saved in the STB and/or the TV system until the TV system display is powered on and the message presented. The STB can be used to support legacy TV systems, which are not IPTV-capable.

Figure 3:
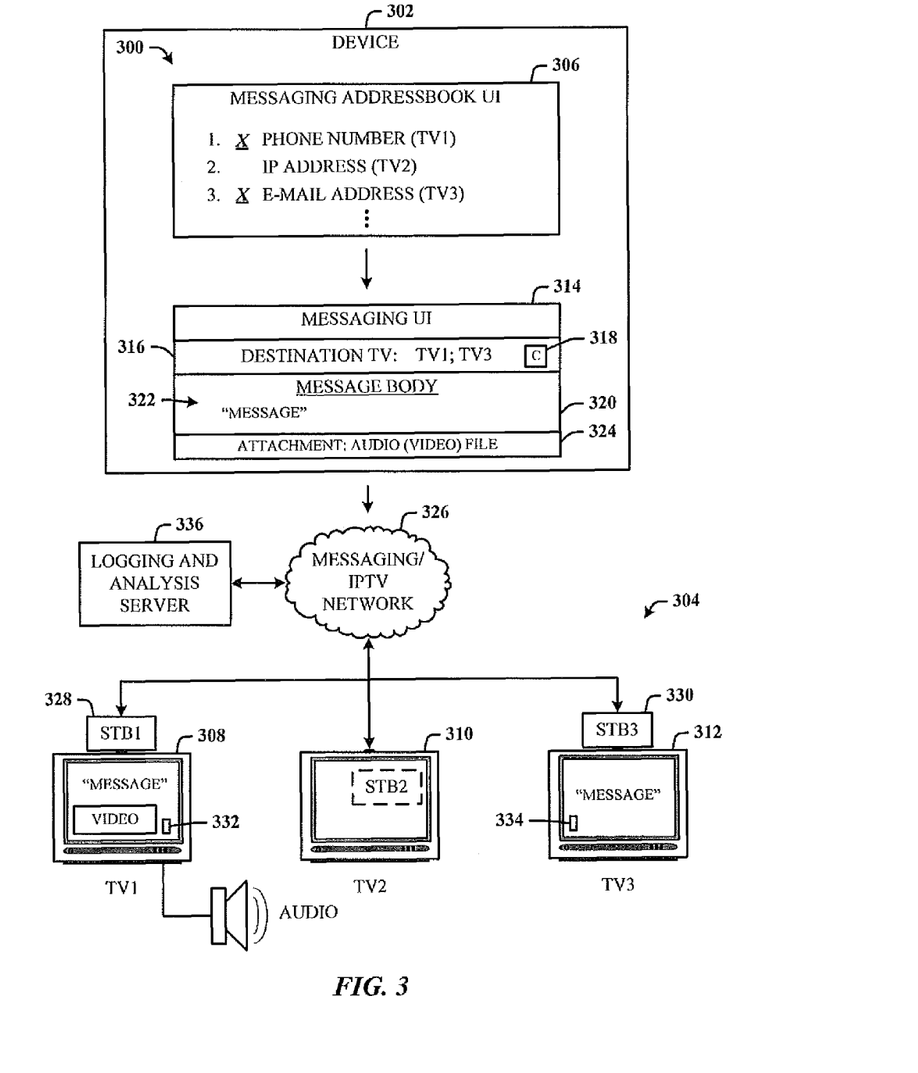
FIG. 3 illustrates an exemplary UI of a device for creating, selecting and sending a message to one or more destination TV systems.

FIG. 3 illustrates an exemplary UI 300 of a device 302 (e.g., portable computer, cell phone) for creating, selecting and sending a message to one or more destination TV systems 304. The UI 300 can include an address book UI 306 via which the user can scroll through destination information in order to select a destination TV system. For example, a destination TV system can be associated with (or mapped to) a phone number, an IP address, and/or an e-mail address. Here, the address book UI 306 shows a listing for at least three TVs: a first TV (TV1) 308, a second TV (TV2) 310, and a third TV (TV3) 312. The user can select one or more of the TVs to receive a message. The user has selected (as marked with an X) the first TV 308 and third TV 312 to receive the message. The first TV 308 is addressable using a mapping of a phone number, and the third TV 312 is addressable using a mapping to an e-mail address.

A messaging UI 314 allows the user to enter the desired message for sending to the TVs (308 and 312). The messaging UI 314 can include a status bar 316 that presents the destination information (e.g., TV1 and TV3) as well as whether the user has selected for a confirmation indicator 318 to be presented on the TVs (308 and 312), and a confirmation message is to be returned back to the device 302 (or other device(s)). The messaging UI 314 can also include a message body area 320 where the user can enter the message 322 and attachments 324. Here, the user has selected to also send an attached audio file (or video file).

When the user sends the message 322 and attachments 324 from the device 302 over a messaging/IPTV network 326 to the TVs 304, the message is sent to both the first TV 308 and the third TV 312 for presentation. The first TV 308 has an associated STB1 328 for receiving and interfacing the message and other signals thereto. Similarly, the third TV 312 has an associated STB3 330 for receiving and interfacing the message and other signals to the first TV 308. As shown, the message and, video and audio attachments can be presented on the first TV 308. Alternatively, the third TV 312 can be selected to receive and present only the message. Either or both of the first TV 308 or/and third TV 312 can be controlled using the respective STBs (328 and 330) to present respective confirmation indicators (332 and 334). Once selected by the viewer, the confirmation information can be returned and processed, as described supra. The second TV 310 is shown with the interface STB2 as an internal subsystem rather than as a set-top box.

The confirmation information is sent back to the device 302 and can be presented to the user as a blinking indicator, for example, which indicates to the user that confirmation not only was selected to be presented, but also received from both TVs (308 and 312).

The system 300 can also include a logging and analysis server 336 for logging (or collecting) messages, summarizing delivery confirmation results, and performing analysis on the messages, message content, delivery methods reliability of delivery, types of confirmation requested, time of delivery, originator, destination, subscriber (QoS) quality-of-service) information, and many other types of information, for example.

FIGS. 4-9 illustrate flow charts representative of methodologies associated with one or more novel embodiments. While, for purposes of simplicity of explanation, the one or more methodologies shown herein, for example, in the form of a flow chart or flow diagram, are shown and described as a series of acts, it is to be understood and appreciated that the subject innovation is not limited by the order of acts, as some acts may in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 4:
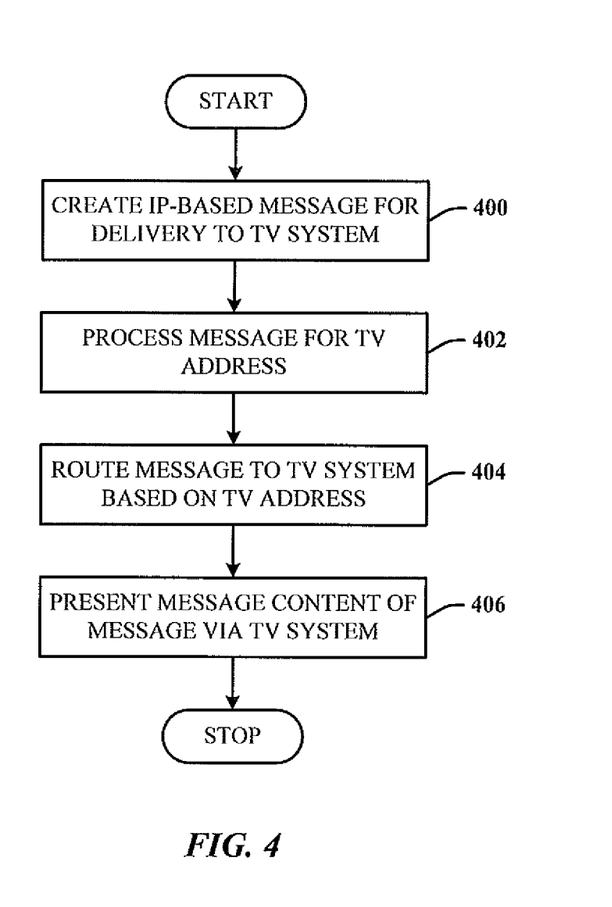
FIG. 4 illustrates a methodology of messaging in accordance with the invention.

FIG. 4 illustrates a methodology of messaging in accordance with the invention. At 400, an IP-based message is created for delivery to a TV system. At 402, the message is processed for the TV address. At 404, the message is routed to the TV system based on the TV address. At 406, the message is then presented via the TV system. As indicated herein, the TV system can include a set-top box that provides the interface for receiving the message according to the address and forwarding message to the TV for processing and presentation.

Figure 5:
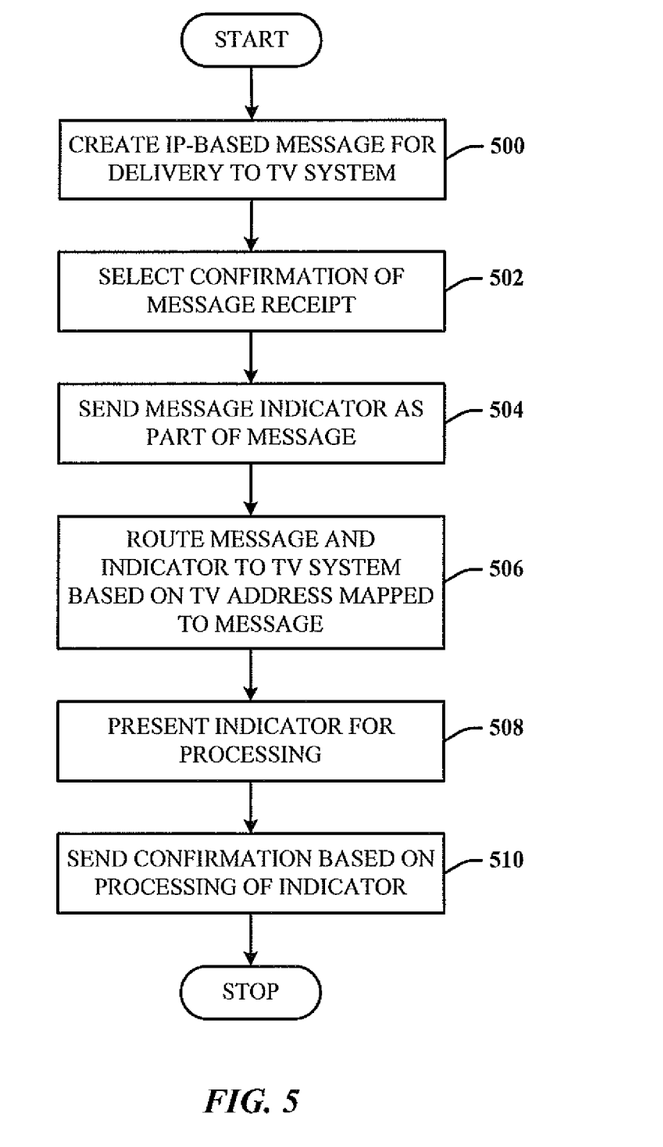
FIG. 5 illustrates a methodology of processing a confirmation request as part of the message delivery to the TV system.

FIG. 5 illustrates a methodology of processing a confirmation request as part of the message delivery to the TV system.

At 500, an IP-based message is created for delivery to a TV system. At 502, in association with message creation and/or delivery, a confirmation option can be selected for confirmation that the message was received at the TV system. At 504, a message indicator is sent as part of the message, which message indicator will prompt the viewer for interaction that results in feedback, or confirmation information being sent back (e.g., to the originating device, or a different location). At 506, the message and at least the indicator are routed to the TV system(s) based on mapping of the TV address to the message. At 508, at the TV system, the message is processed and the indicator presented for processing (e.g., viewer interaction). At 510, a confirmation message is sent based on processing of the indicator.

Figure 6:
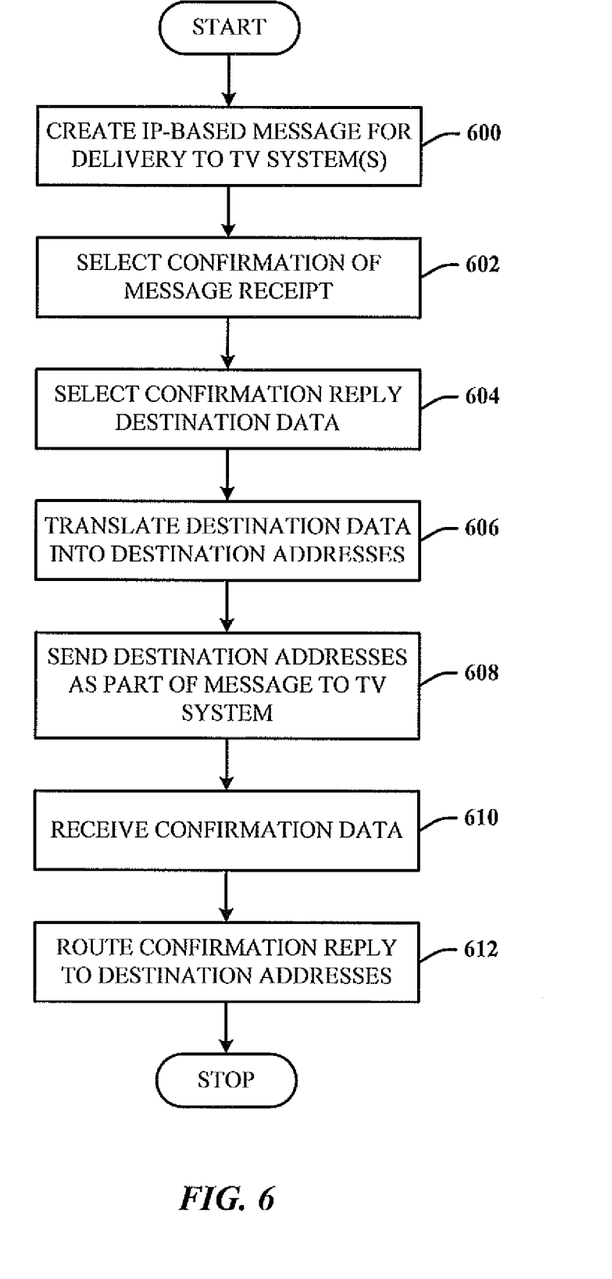
FIG. 6 illustrates a methodology of returning a confirmation message to multiple destinations.

Referring now to FIG. 6, there is illustrated a methodology of returning a confirmation message to multiple destinations. At 600, an IP-based message is created for delivery to one or more TV systems. At 602, confirmation is selected for the message receipt. At 604, the user selects the reply destination data, which determines to which systems, the originating, or otherwise, the confirmation receipt will be sent. At 606, the destination data is translated into destination addresses. At 608, the destination addresses are sent as part of the message to the TV system. At 610, the confirmation data is received at the TV system. At 612, the confirmation reply is routed to the destination addresses.

Figure 7:
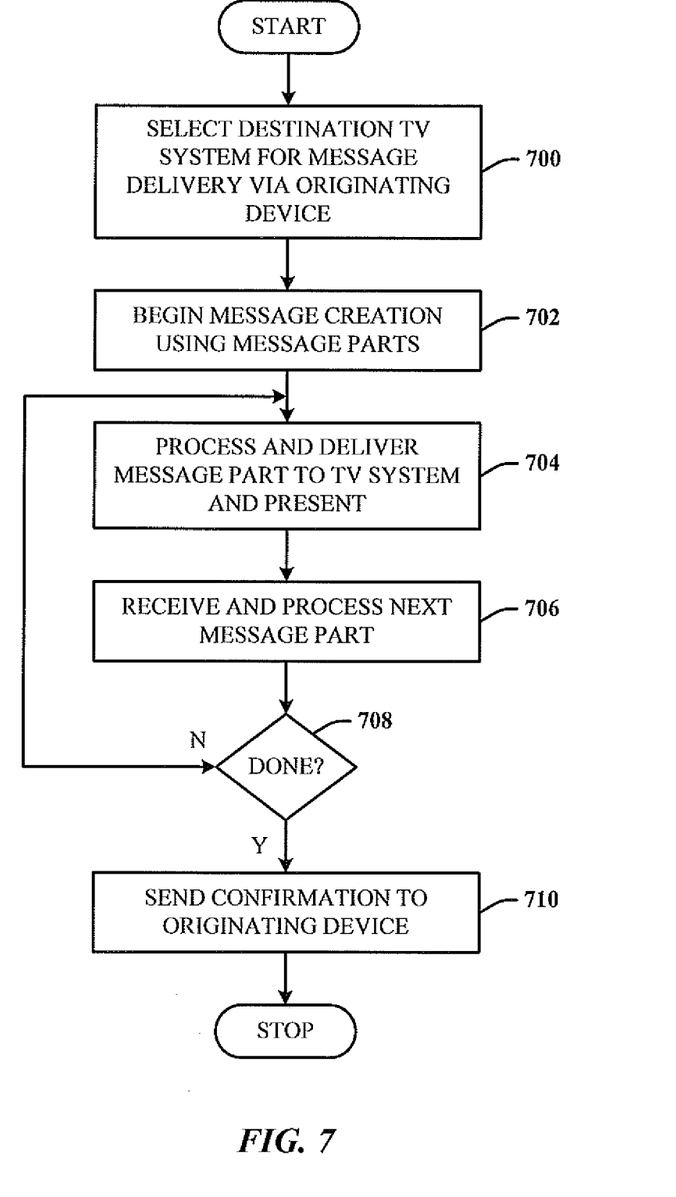
FIG. 7 illustrates a methodology of sending message parts while the originator is writing the message.

FIG. 7 illustrates a methodology of sending message parts while the originator is writing the message. At 700, a destination TV system is selected for message delivery via an originating device. At 702, the originating user begins creating the message using message parts. At 704, a message part is processed, delivered, and presented. At 706, a next message part is received and processed. At 708, the system checks to see if message creation is done. If not, flow can be back to 704 to process and deliver the next message part. If done, flow is from 708 to 710 to send a confirmation to the originating device.

Figure 8:
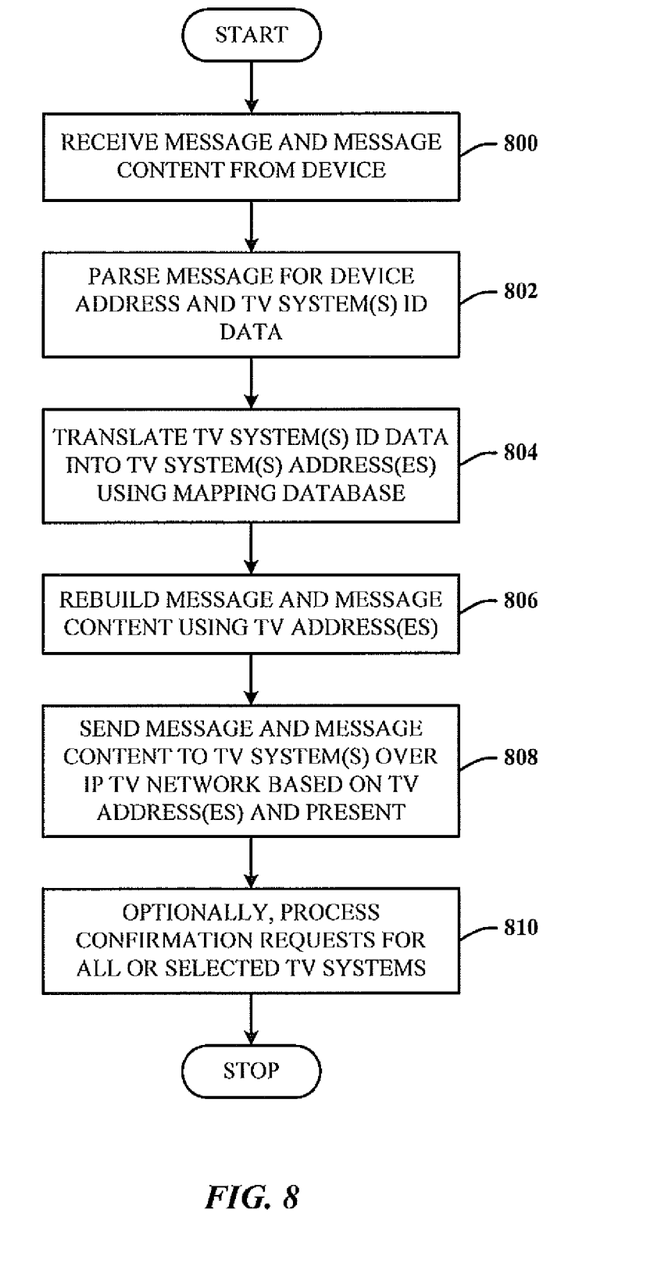
FIG. 8 illustrates a methodology of sending a single message to multiple TV systems for presentation.

FIG. 8 illustrates a methodology of sending a single message to multiple TV systems for presentation. At 800, a message and associated message content is received from a device. At 802, the message is parsed for a device address and TV systems ID data. At 804, the TV system ID data is translated into TV systems addresses using a mapping database. At 806, the message and message content are rebuilt using the TV systems addresses. At 808, the message and message content are sent to the TV systems over an IP TV network based on the TV addresses, and the content is presented. At 810, optionally, a confirmation request was sent in the message and a confirmation reply is sent back to one or more systems.

Figure 9:
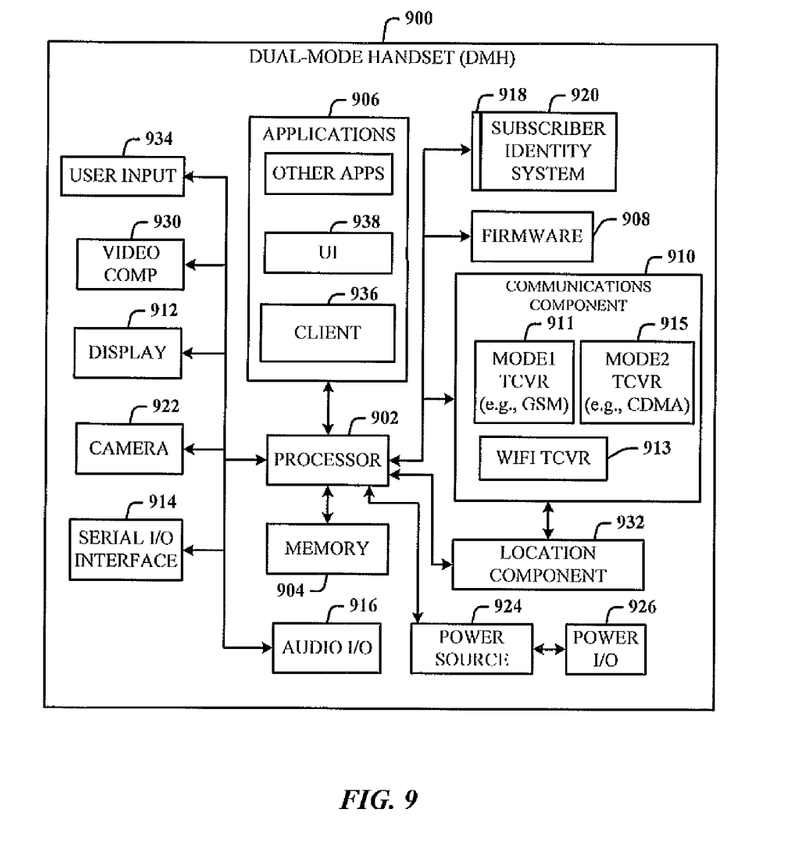
FIG. 9 illustrates a schematic block diagram of an exemplary dual mode handset for message creation, communication, and confirmation receipt in accordance with a novel aspect.

FIG. 9 illustrates a schematic block diagram of an exemplary dual mode handset 900 for message creation, communication, and confirmation receipt in accordance with a novel aspect. The handset 900 includes a processor 902 for controlling and processing all onboard operations and functions. A memory 904 interfaces to the processor 902 for storage of data and one or more applications 906 (e.g., a video player software, user feedback component software, etc.). The applications 906 can further include the messaging address book UI 306, and messaging UI for message creation, for example.

The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, for example, cellular networks, VoIP networks, IP networks, and so on. Here, the communications component 910 can also include a first suitable cellular transceiver 911 (e.g., a GSM transceiver) as one mode, and an unlicensed transceiver 913 (e.g., Wi-Fi, Bluetooth, WiMax) for corresponding signal communications, and a second cellular transceiver 915 (e.g., a CDMA transceiver) for a second mode. The handset 900 can be a device such as a cellular telephone, a PDA with mobile communications capabilities, and messaging-centric devices. The communications component 910 can also facilitate communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. The display 912 can also accommodate the presentation of multimedia content (e.g., music metadata, messages, wallpaper, graphics, . . . ). A serial I/O interface 914 is provided in communication with the processor 902 to facilitate wired and/or wireless serial communications (e.g., USB, and/or IEEE 1394) via a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals via a microphone to record data and/or telephony voice data, and for inputting voice signals for telephone conversations.

The handset 900 can include a slot interface 918 for accommodating a subscriber identity system 920 that can accommodate a SIM or universal SIM (USIM), and interfacing the subscriber identity system 920 with the processor 902. However, it is to be appreciated that the subscriber identity system 920 can be manufactured into the handset 900, and updated by downloading data and software thereinto.

The handset 900 can process IP data traffic via the communication component 910 to accommodate IP traffic from an IP network such as, for example, the Internet, a corporate intranet, a home broadband network, a person area network, etc., via an ISP or broadband cable provider. Thus, VoIP traffic can be utilized by the handset 900 and IP-based multimedia content can be received in either an encoded or decoded format.

An image capture and processing component 922 (e.g., a camera) can be provided for decoding encoded multimedia content. The handset 900 also includes a power source 924 in the form of batteries and/or an AC power subsystem, which power source 924 can interface to an external power system or charging equipment (not shown) via a power I/O component 926.

The handset 900 can also include a video component 930 for processing video content received and, for recording and transmitting video content. A location tracking component 932 facilitates geographically locating the handset 900 (e.g., GPS-global positioning system). A user input component 934 facilitates the user input via conventional input device technologies such as a keypad, keyboard, mouse, stylus pen, touch screen and voice activation, for example.

Referring again to the applications 906, a client 936 can be provided that facilitates AP detection, BSSID extraction and transmission of the handset and AP data to the cellular network for authorization. The applications 906 can also include a user interface application 938 that operates with the client 936 to present the handset and AP data, and that facilitates at least the capability of discovery, play and store of multimedia content, for example, music.

The handset 900, as indicated supra related to the communications component 910, includes the indoor network radio transceiver 913 (e.g., WiFi transceiver). This function supports the indoor radio link, such as IEEE 802.11, for the dual-mode GSM handset 900. The handset 900 can also accommodate at least satellite radio services through a handset that can combine wireless voice and digital radio chipsets into a single handheld device. It is to be understood that although the handset 900 is illustrated as including a GSM mode, modes other than GSM can be accommodated.

As used in this application, the terms "component" and "system" are intended to refer to hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer or mobile terminal (cell phone).

Although applicable to any existing or yet to be developed wireless telecommunications network, the aspects of the invention will be described with reference to the global system for mobile communications (GSM) air interface that uses general packet radio service (GPRS) as an enabling bearer. Examples of other suitable wireless and radio frequency data transmission systems include networks utilizing time division multiple access (TDMA), frequency division multiple access (FDMA), wideband code division multiple access (WCDMA), orthogonal frequency division multiplexing (OFDM), and various other 2.5 and 3G (third generation) and above wireless communications systems. Examples of other suitable enabling bearers include universal mobile telecommunications system (UMTS), enhanced data rates for global evolution (EDGE), high speed downlink packet access (HSDPA), and similar communications protocols. The disclosed architecture also is compatible with IP multimedia subsystem (IMS), a 3G technology for interfacing IP networks with cellular networks and services.

Figure 10:
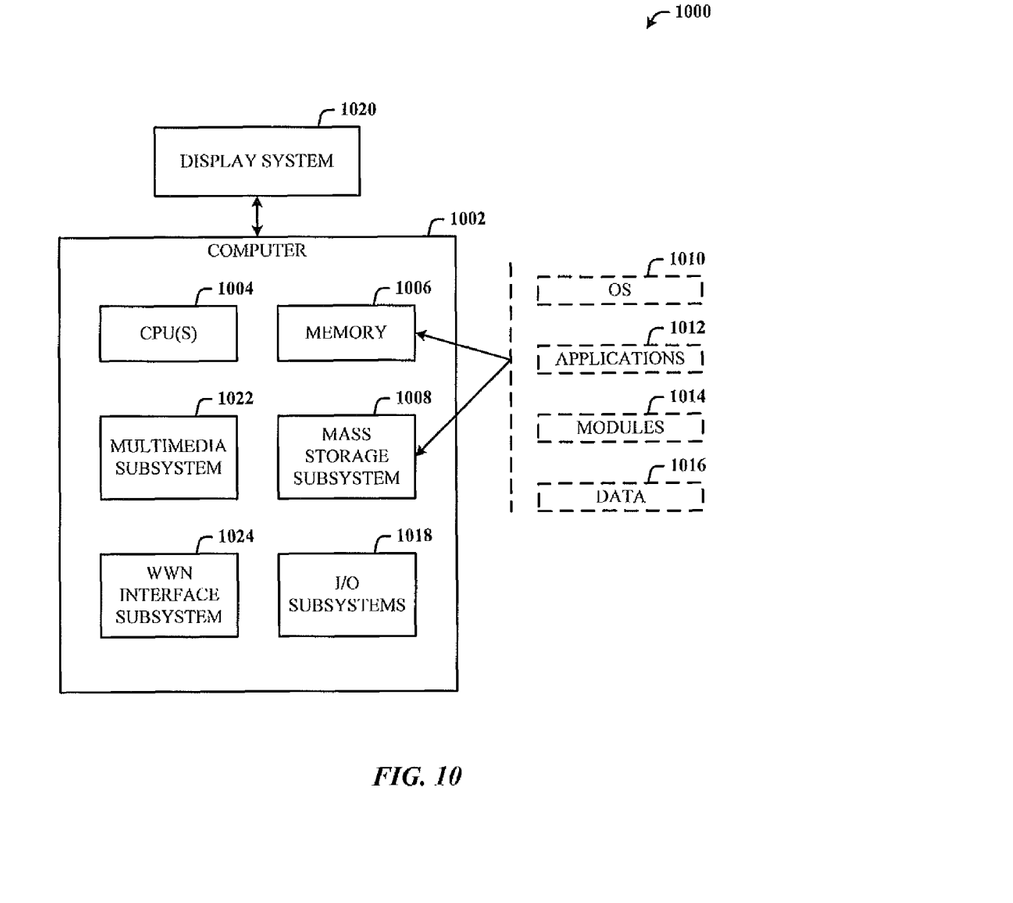
FIG. 10 illustrates a block diagram of a computing system operable to execute messaging communications and/or confirmation processing in accordance with the disclosed architecture.

FIG. 10 illustrates a block diagram of a computing system 1000 operable to execute messaging communications and/or confirmation processing in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002, the computer 1002 including a processing subsystem (e.g., single or multi-processor) 1004 and memory 1006. The processing unit 1004 can be any of various commercially available processors. The memory 1006 can include read-only memory (ROM), random access memory (RAM), flash memory, and/or insertable memory cards, for example. The memory 1006 can include a basic input/output system (BIOS) is stored in a non-volatile memory such as ROM, EPROM, EEPROM, which BIOS contains the basic routines that help to transfer information between elements within the computer 1002, such as during start-up. The memory 1006 can also include a high-speed RAM such as static RAM for caching data.

The computer 1002 further includes an internal mass storage subsystem 1008 such as hard disk drives (HDD), a floppy disk drive (FDD), and/or optical disk drive(s) (e.g., for read/write of optical media such as CDs and DVDs).

The drives and associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

Software can be stored on the computer 1002 in the memory 1006 and/or the mass storage subsystem 1008, including an operating system 1010, one or more application programs 1012, other program modules 1014, and program data 1016. All or portions of the operating system, applications, modules, and/or data can also be cached in cache memory as part of the memory 1006. It is to be appreciated that the disclosed architecture can be implemented with various commercially available operating systems or combinations of operating systems.

A user can enter commands and information into the computer 1002 through input/output (I/O) subsystems 1018, which can include one or more wire/wireless I/O devices, for example, a keyboard, and a pointing device such as a mouse, a microphone, an IR remote control, a joystick, a game pad, a stylus pen, touch screen, and/or the like. These and other input devices can be connected to the processing unit 1004 through an input device interface of the I/O subsystems 1018 that can be connected internal buses, a parallel port, an IEEE 1394 serial port, a game port, a USB port, an IR interface, etc.

The system 1000 can also include a display system 1020 which can include one or more displays. In addition, the computer 1002 can interface to peripheral output devices, such as speakers, printers, etc. A multimedia subsystem 1022 facilitates the processing, presentation, and output of multimedia content, for example, text, graphics, images, video, and audio.

The computer 1002 can operate in a networked environment using logical connections via wire and/or wireless network (WWN) interface subsystem 1024 for mobile and/or IP-based communications to one or more networks (e.g., cellular, IP). The logical connections can include connectivity to a local area network (LAN) and/or larger networks, for example, a wide area network (WAN), and/or enterprise or unlicensed networks. Such networking environments are commonplace in offices and businesses, and facilitate enterprise-wide computer networks, such as intranets, all of which may connect to a global communications network (e.g., the Internet, cellular network).

The computer 1002 is operable to communicate with any wireless devices or entities operatively disposed in wireless communication, for example, a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi, WiMax, and Bluetooth™ wireless technologies, for example. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, for example, computers, to send and receive data indoors and out; anywhere within the range of a base station. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3 or Ethernet).

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor;
   a computer-readable storage device comprising instructions that, when executed by the processor, cause the processor to perform operations comprising:
   receiving, via a first network, a first message comprising one of a textual, an audio, and a video attachment, an indicator, and data associated with a first television system in communication with a second network;
   generating, in response to receiving the first message, a second message including an Internet protocol (IP) message;
   sending the IP message and one of the textual, the audio and the video attachment to the first television system by way of the second network; and
   sending, based on the indicator, only the IP message to a second television system in communication with the second network.

2. The system of claim 1, wherein the first network is an Internet protocol data network and the second network is a television network.

3. The system of claim 1, wherein the first message comprises information uniquely identifying the first television system.

4. The system of claim 3, wherein the operations further comprise parsing the first message to select the information uniquely identifying the first television system.

5. The system of claim 1, wherein the second message includes one of the textual, the audio, and the video attachment.

6. The system of claim 1, wherein one of the first message and the second message includes a multi-media file.

7. The system of claim 1, wherein the operations further comprise requesting a third message from the first television system in response to sending the second message to the first television system.

8. The system of claim 7, wherein the operations further comprise sending the third message to a computing device in communication with the first network.

9. The system of claim 1, wherein the operations further comprise sending the second message to a plurality of television systems in communication with the second network.

10. A method, comprising:
    receiving, by a server comprising a processor, a first message via a first network, the first message comprising one of a textual, an audio, and a video attachment, an indicator, and data associated with a first television system in communication with a second network;
    generating, by the server and in response to receiving the first message, a second message including an Internet protocol (IP) message;
    sending, by the server,
    the IP message and one of the textual, the audio, and the video attachment to the first television system by way of the second network; and
    sending, by the server and based on the indicator, only the IP message to a second television system in communication with the second of network.

11. The method of claim 10, wherein the first network is an Internet protocol data network and the second network is a television network.

12. The method of claim 10, wherein receiving the first message comprises receiving information uniquely identifying the first television system.

13. The method of claim 10, wherein one of the first message and the second message includes a multi-media file.

14. The method of claim 12, further comprising parsing, by the server, the first message to select the information uniquely identifying the first television system.

15. The method of claim 10, further comprising requesting, by the server, a third message from the first television system in response to sending the second message to the first television system.

16. The method of claim 15, further comprising sending, by the server, the third message to a device in communication with the first network.

17. The method of claim 10, further comprising sending, by the server, the second message to a plurality of television systems in communication with the second network.

18. A computer-readable storage device, for use at a system in communication with a first network and a second network, comprising instructions that, when executed by a processor, cause the processor to perform operations comprising:

receiving a first message over the first network, the first message comprising one of a textual, an audio, and a video attachment, an indicator, and data associated with a first television system in communication with the second network;

generating, in response to receiving the first message, a second message including an Internet protocol (IP) message;

sending the IP message and one of the textual, the audio, and the video the attachment to the first television system by way of the second network; and     sending, based on the indicator, only the IP message to a second television system in communication with the second network.

19. The computer-readable storage device of claim 18, wherein the first network is an Internet protocol data network and the second network is a television network.

20. The computer-readable storage device of claim 18, wherein receiving the first message comprises receiving information uniquely identifying the first television system.

* * * * *